United States Patent
Phan et al.

(10) Patent No.: US 10,561,269 B2
(45) Date of Patent: Feb. 18, 2020

(54) VOLUMETRIC HEATING DEVICE FOR BEVERAGE OR FOOD PREPARATION MACHINE

(71) Applicant: Nestec S. A., Vevey (CH)

(72) Inventors: Minh Quan Phan, Bussigny (CH); Peter Vockenhuber, Sierre (CH); Robert Medek, Vienna (AT)

(73) Assignee: Societe des Produits Nestle S.A., Vevey (CH)

( * ) Notice: Subject to any disclaimer, the term of this patent is extended or adjusted under 35 U.S.C. 154(b) by 364 days.

(21) Appl. No.: 14/900,906

(22) PCT Filed: Jun. 23, 2014

(86) PCT No.: PCT/EP2014/063098
§ 371 (c)(1),
(2) Date: Dec. 22, 2015

(87) PCT Pub. No.: WO2014/206905
PCT Pub. Date: Dec. 31, 2014

(65) Prior Publication Data
US 2016/0150910 A1    Jun. 2, 2016

(30) Foreign Application Priority Data
Jun. 26, 2013 (EP) ................................ 13173775

(51) Int. Cl.
*A47J 31/44* (2006.01)
*A47J 31/54* (2006.01)
(Continued)

(52) U.S. Cl.
CPC ........... *A47J 31/445* (2013.01); *A47J 31/542* (2013.01); *F24H 1/121* (2013.01); *F24H 1/162* (2013.01);
(Continued)

(58) Field of Classification Search
CPC . H01L 27/0248; H01L 29/0626; H01L 29/87; A01P 7/02; A01P 7/04;
(Continued)

(56) References Cited

U.S. PATENT DOCUMENTS 3,915,180 A * 10/1975 Jacobs ................ A47L 15/4242
134/58 D
3,926,556 A * 12/1975 Boucher .................. A23C 3/07
250/435
(Continued)

FOREIGN PATENT DOCUMENTS

CN   101742951 A   6/2010
CN   201858773 U   6/2011
(Continued)

OTHER PUBLICATIONS

International Search Report, dated Aug. 18, 2014, in PCT/EP2014/063098, filed Jun. 23, 2014.
(Continued)

*Primary Examiner* — Ibrahime A Abraham
*Assistant Examiner* — Gyounghyun Bae
(74) *Attorney, Agent, or Firm* — K&L Gates LLP

(57) ABSTRACT

A volumetric heating device for beverage preparation machines, along with a beverage preparation machine containing same, are disclosed, along with methods of producing and using same.

15 Claims, 12 Drawing Sheets

(51) Int. Cl.
  *F24H 1/12* (2006.01)
  *F24H 1/16* (2006.01)
  *H05B 3/00* (2006.01)
  *H05B 6/10* (2006.01)

(52) U.S. Cl.
  CPC .......... *H05B 3/0052* (2013.01); *H05B 6/108* (2013.01); *H05B 2203/032* (2013.01)

(58) Field of Classification Search
  CPC .. A01N 9/02; A01N 9/36; C07F 9/113; H05B 3/0052; H05B 2203/032
  USPC ......... 219/552–553; 392/343, 375–377, 391, 392/407–440, 483
  See application file for complete search history.

(56) References Cited

U.S. PATENT DOCUMENTS

| | | | | |
|---|---|---|---|---|
| 3,995,934 | A * | 12/1976 | Nath | A61B 18/22 385/125 |
| 4,378,488 | A * | 3/1983 | Jager | H05B 3/80 219/512 |
| 4,980,537 | A * | 12/1990 | Knauss | H05B 3/50 219/535 |
| 5,046,409 | A * | 9/1991 | Henn | A47J 31/0576 99/285 |
| 5,382,441 | A * | 1/1995 | Lentz | A21B 2/00 426/241 |
| 5,559,924 | A * | 9/1996 | Kadotani | F24H 1/142 392/483 |
| 5,616,024 | A * | 4/1997 | Nobori | C23C 16/46 219/444.1 |
| 5,992,298 | A * | 11/1999 | Illy | A47J 31/36 99/281 |
| 6,321,035 | B1 * | 11/2001 | Gerosa | F22B 1/281 392/399 |
| 6,350,973 | B2 * | 2/2002 | Wroe | H05B 6/62 219/680 |
| 6,537,481 | B2 * | 3/2003 | Brennan | C04B 35/64 264/406 |
| 6,713,945 | B2 * | 3/2004 | Fuchs | H01K 1/06 250/493.1 |
| 6,888,116 | B2 * | 5/2005 | Dalton | B01D 53/32 219/687 |
| 7,190,894 | B2 * | 3/2007 | Chamberlain, Jr. | F24D 17/00 392/465 |
| 7,386,265 | B2 * | 6/2008 | Ito | G03G 15/2053 219/216 |
| 7,432,483 | B2 * | 10/2008 | Wilson | A21B 2/00 219/388 |
| 7,565,065 | B2 * | 7/2009 | Kato | F24H 1/102 392/311 |
| 8,661,967 | B2 * | 3/2014 | Gonen | A47J 31/36 99/281 |
| 8,687,951 | B2 * | 4/2014 | Servidio | F24D 11/002 392/411 |
| 9,014,548 | B2 * | 4/2015 | Jang | F24H 1/0018 392/465 |
| 9,485,807 | B2 * | 11/2016 | Uchida | F24H 1/101 |
| 9,494,311 | B2 * | 11/2016 | Moughton | F24H 1/142 |
| 2004/0175162 | A1 | 9/2004 | Linow et al. | |
| 2012/0189447 | A1 * | 7/2012 | Linow | H05B 3/0033 416/95 |
| 2012/0275775 | A1 * | 11/2012 | Iskrenovic | F24H 1/142 392/483 |
| 2014/0226959 | A1 * | 8/2014 | Sibeud | C21D 1/04 392/418 |
| 2014/0272025 | A1 * | 9/2014 | Wheeler | A47J 31/46 426/231 |
| 2014/0322403 | A1 * | 10/2014 | Drozd | A23L 3/005 426/231 |

FOREIGN PATENT DOCUMENTS

| | | |
|---|---|---|
| CN | 102410621 A | 4/2012 |
| CN | 202254229 U | 5/2012 |
| CN | 102840676 A | 12/2012 |
| DE | 2440426 A1 | 3/1976 |
| FR | 2855359 A1 | 11/2004 |
| JP | 52-5854 A | 1/1977 |
| JP | S5399326 A | 8/1978 |
| JP | 61061391 | 3/1986 |
| JP | H0485963 A | 3/1992 |
| JP | H05079695 A | 3/1993 |
| JP | 2004273453 A | 9/2004 |
| WO | 2008144471 A1 | 11/2008 |

OTHER PUBLICATIONS

Written Opinion of the International Searching Authority, dated Aug. 18, 2014, in PCT/EP2014/063098, filed Jun. 23, 2014.
CN2014800361506, Nestec S.A. Office Action and English Translation dated Jan. 19, 2018; 11 pages.
CN2014800361506; Nestec S. A.; Search Report; 2 pages.
JP2016-522419; Nestec S.A.; Office Action and English Translation dated May 8, 2018; 8 pages.
AU2014301278; Nestec S. A.; Office Action dated May 23, 2018; 8 pages.
RU2015151798; Nestec S. A.; Office Action and English Translation dated Apr. 18, 2018; 10 pages.

* cited by examiner

VOLUMETRIC HEATING DEVICE FOR BEVERAGE OR FOOD PREPARATION MACHINE

CROSS REFERENCE TO RELATED APPLICATIONS/INCORPORATION BY REFERENCE STATEMENT

This application is a US national stage application filed under 35 USC § 371 of International Application No. PCT/EP2014/063098, filed Jun. 23, 2014; which claims priority to Application No. EP 13173775.1, filed Jun. 26, 2013. The entire contents of the above-referenced application are hereby expressly incorporated herein by reference.

BACKGROUND

The presently disclosed and/or claimed inventive concept (s) relates to a volumetric heating device that may be applied in a beverage or food preparation machine.

The volumetric heating device is especially designed to heat a liquid, used in the beverage or food preparation process, in particular in beverage or food dispensing machines such as coffee, tea, or soup automats.

It is well known that microwaves can be used for volumetric heating of a liquid. For example, a liquid, e.g. water, fat, and other substances absorb energy from emitted microwaves in a process called dielectric heating. Many molecules (such as those of water) are electric dipoles, meaning that they have a partial positive charge at one end and a partial negative charge at the other, and therefore rotate as they try to align themselves with the alternating electric field of the microwaves. Rotating molecules hit other molecules and put them into motion, thus dispersing energy. This energy, when dispersed as molecular vibration in solids and liquids (i.e., as both potential energy and kinetic energy of atoms), is heat. Volumetric heating hence differs from conventional heating methods and means that energy is directly conveyed to the molecules of the liquid without requiring a heat exchanger.

However, microwave heating devices are often complex devices and are also expensive. A microwave heating device, e.g., may comprise a high voltage power source, commonly a simple transformer or an electronic power converter, which passes energy to a magnetron, a high voltage capacitor connected to the magnetron. The device needs the magnetron itself, which converts high-voltage electric energy to microwave radiation, and also requires a magnetron control circuit (usually with a microcontroller). Further, a waveguide (to control the direction of the microwaves) and a cooking chamber, commonly formed of a conductive material and built similar to a faraday cage to prevent the microwaves from leaving the cooking chamber are essential parts.

While microwave heating devices such as microwave ovens are available on the market to the customer for relatively low prices, an application in beverage or food preparation devices is often complicated due to technical and safety requirements, but also due to the room required for such application.

In turn, the price of generally relatively simple beverage or food preparation devices would be drastically increased by application of such microwave heating devices.

It is therefore an aim of the presently disclosed and/or claimed inventive concept(s) to provide an alternative to a microwave heating device which can be easily and safely used, for example in a catering environment, and which can be easily implemented in beverage or food preparation machines requiring that a liquid is heated. Also, the room needed for application of the inventive heating device is considerably lower than for known heating devices.

The presently disclosed and/or claimed inventive concept (s) provides a solution to these problems as claimed with the independent claims. Further beneficial aspects of the presently disclosed and/or claimed inventive concept(s) are subject to the dependent claims.

DETAILED DESCRIPTION

Figure 1:
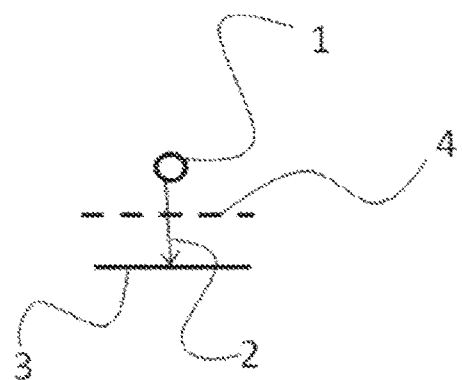
FIG. 1 shows a basic setup of the volumetric heating device of the presently disclosed and/or claimed inventive concept(s).

In one aspect, the presently disclosed and/or claimed inventive concept(s) provides a volumetric heating device for beverage preparation machines, comprising an emission source designed for emitting electromagnetic radiation, such as (but not limited to) in the infrared and/or ultra violet spectrum, and to transfer the energy to a liquid at least partially surrounding the emission source, a liquid conduit, and an isolation means essentially transparent to the electromagnetic radiation in the emitted spectrum, and designed to electrically and/or thermally isolate the emission source from the liquid.

The volumetric heating device can be configured to selectively supply the liquid to the isolation means to at least partially immerse the isolation means into the liquid.

In certain non-limiting embodiments, the liquid is water. The isolation means can be glass, such as (but not limited to) quartz glass or borosilicate glass.

The emission source may comprise a filament, such as (but not limited to) a meandering filament and/or a helical filament, e.g. a wire wound in a helix configuration.

The helix configuration may be a simple helix, a double helix or a higher order helix.

In certain non-limiting embodiments, filament may provide essentially a line shaped, a v-shaped, a triangle shaped, a rectangle shaped, a star shaped or a meander shaped cross section outline, in particular a polygon shaped cross section outline. In certain non-limiting embodiments, the filament is a stripe, such as (but not limited to) a metal stripe.

The volumetric heating device can be configured to supply the liquid to the isolation means in a film of specific thickness.

The thickness of the film is determined by the percentage of energy to be absorbed by the liquid, and wherein the percentage of energy to be absorbed may be 97% to 99%.

The thickness of the film can be 0.5 to 6 mm, such as (but not limited to) 1 to 4 mm, or 1 to 2 mm.

The filament may provide an emission power per $cm^2$ (physically speaking the luminance) when enclosed in vacuum of about 5-10 $W/cm^2$.

The emission source and the isolation means can be at least partially surrounded by a cover means, the cover means being arranged in a specific distance to the isolation means. The cover means can be designed to define the thickness of the film to be exposed to the emission source. The cover means may at least partially form the liquid conduit.

The heating device may be configured to convey the liquid past the emission source. The heating device can further comprise a pump and/or liquid channeling element arrangement for conveying the liquid past the emission source. The heating device can be a flow-through heating device. A volume can be provided in the heating device for heating the liquid, and in certain non-limiting embodiments, the volume between the cover means and the isolation means can be 5 to 15 ml, such as (but not limited to) 7 to 13 ml or 10 ml. It may also comprise a guidance means setting the liquid into rotational movement when the liquid guidance passes the guidance means. Especially, the guidance means is configured to cause a rotational movement of the liquid passing the guidance means.

In another aspect, the presently disclosed and/or inventive concept(s) provides a lamp comprising an emission source designed for emitting electromagnetic radiation in the infrared spectrum, electric connection means adapted for providing electric energy to the emission source, wherein the emission source comprises a filament, such as (but not limited to) a metal stripe, wherein a cross-section outline of the meandering filament may be (but is not limited to) essentially line shaped, v-shaped, triangle shaped, rectangle shaped, star shaped or meander shaped, in particular polygon shaped, and an isolation means essentially transparent to the electromagnetic radiation in the emitted infrared spectrum, and designed to electrically isolate the emission, in particular at least partially surrounding the emission source.

The lamp can comprise a hollow portion wherein the hollow portion is configured to allow passage of at least one liquid.

In yet another aspect, the presently disclosed and/or claimed inventive concept(s) provides a beverage or food preparation machine configured to serve warm beverages or food, especially tea or coffee, comprising a volumetric heating device as described above and/or a lamp as described above.

A key aspect of the presently disclosed and/or claimed inventive concept(s) is that a liquid, especially water, while appearing transparent in one spectrum, e.g. the spectral range visible to the human eye, may not be transparent in another spectrum. Especially, the liquid to be heated may essentially be a black body in the other spectrum. The presently disclosed and/or claimed inventive concept(s) uses this principle, to provide an emission source emitting energy in a spectrum in which the liquid to be heated appears as essentially a black body, which results in the energy being almost fully absorbed by the liquid. For example, water is transparent in the spectral range visible to the human eye and hence, radiation outside this spectral range can be effectively used to transfer energy to the water, especially to heat it.

As indicated above, the principle of the volumetric heating device according to the presently disclosed and/or claimed inventive concept(s) is that the volumetric heating device comprises an emission source, which when connected to a power source, emits or radiates energy in a specific spectrum, to transfer the energy to a liquid, which essentially constitutes a black body in the spectrum in which the energy is emitted.

FIG. 1 shows a very basic schematic of the presently disclosed and/or claimed inventive concept(s), which shows an emitter 1 emitting energy 2 denoted by an arrow to a liquid 3.

In order to separate or isolate the emission source 1 from the liquid 3 that should be heated, the presently disclosed and/or claimed inventive concept(s) also comprises an isolation means 4. The isolation means 4 is essentially transparent to the emitted energy 2, i.e. is transparent in the spectrum or spectral range in which the energy and/or light is emitted.

According to the presently disclosed and/or claimed inventive concept(s), the liquid to be heated can be applied directly onto the isolation means and hence, when the volumetric heating device is in operation, the isolation means can be at least partially immersed in the liquid to be heated.

In order to provide a cost-effective solution to the problem, the presently disclosed and/or claimed inventive concept(s) uses (in certain non-limiting embodiments) light in the infrared spectrum of electromagnetic waves.

In the following, the term "infrared light" (IR) is used synonym to the emission of energy in this spectrum. However, as said above, emission in another spectrum, i.e. energy of a different wavelength could be used for transferring energy to the liquid. The absorption in the ultraviolet spectrum of the liquid, e.g. water, may be higher. Hence also ultra violet (UV) light sources could be used according to the presently disclosed and/or claimed inventive concept(s). They are, however, not further discussed in more detail in the remainder of this document as they are more expensive when compared to IR-light sources. It is especially beneficial, that parts for an infrared emitter are available on the market and can be obtained at relatively low costs. Moreover, while the presently disclosed and/or claimed inventive concept(s) also relates to food preparation machines, in the following only the term beverage preparation machine is used. Especially, the electromagnetic radiation used according to the presently disclosed and/or claimed inventive concept(s) is, in certain non-limiting embodiments, centered about a wavelength of 2.2 µm or more than 2.2 µm.

Also, using volumetric heating is beneficial over the conventional heating methods described above (e.g. needing a heat exchanger) as a considerably shorter heat-up time of the liquid results. The energy emitted by the emission source is directly absorbed by the liquid (e.g. water). This also increases the over-all efficiency, as no part of the heating device is heated to a temperature that is higher than the temperature of the heated liquid.

This also leads to a reduction of calcium residue in the heating device, especially when water is heated, as typically most of the precipitation of calcium occurs at the hottest parts of a (conventional) heating device, i.e. parts that are hotter than the heated liquid. As the volumetric heating provides a uniform temperature in the liquid, the calcium falls out throughout the heated volume. This results from the fact that in a volumetric heating device (comprising a volumetric heating cell) as presented there are no hotter parts than liquid itself. In certain non-limiting embodiments, the calcium can then be transferred out of an area in which the liquid is heated together with the liquid.

This is especially the case if the filament (with approximately 1000° K) is thermally isolated from the isolation means. The most efficient way to achieve such thermal isolation is by evacuation of the isolation means containing the filament. In this way, the isolating walls of the isolation means, which are transparent to the IR radiation/emission, cannot be heated by a thermally conducting gas inside this containment. This is also beneficial for conveying thermal energy to the liquid and the liquid alone.

Any contribution of heat conduction will have an effect of heating also the isolation means walls and may thus cause calcium precipitation. Of course, when the use time is short (as for the intended purpose a time of about tens of second, e.g. 1-10 seconds), there will be no time for the isolation means walls to heat up. But for other applications with longer (or continuous) use, i.e. a higher use time, a vacuum isolation could be disadvantageous.

In case the volumetric heating device is a flow-through heating device, the calcium can be transferred out of the volumetric heating device with the liquid flow. The calcium can then be filtered out in a later step. In the case of beverage preparation machines using capsules in the beverage production process, the calcium can be filtered out through residues remaining in the capsule through which the liquid is passed.

The presently disclosed and/or claimed inventive concept(s) also provides a low-cost design alternative for an infrared emission source or an IR lamp configuration. Especially, the emission source of an infrared lamp used in the application can show a specific design which is tailored to be especially efficient for use in beverage preparation machines.

One important parameter for designing the heating device is the emission maximum of the emission source, which should match the absorption maximum of the liquid to be heated, for example water. The emission source, which is especially a filament arranged inside the isolation means, which may be (but is not limited to being) glass, is hence designed to emit within a wavelength of about 2.2 µm, which requires the filament to be heated to a temperature of about 1300° C. This relation is determined by Wien's law.

A second constraint that has to be taken into account for a well-adapted emission spectrum results from the Stefan-Boltzmann law, which states that the emission surface per unit power, which is necessary to emit/radiate a required peak wavelength, increases with the inverse of the fourth power of the temperature.

Also the filament surface has a limited emission power per cm$^2$ (the luminance) when enclosed in vacuum. When this limit is reached or exceeded, sputtering may occur, and the useful work life of the volumetric heating device may be reduced. The sputtering limit is posed by the choice of the filament material and by the residual gas pressure in the isolation means. Higher gas pressure yields a higher sputtering limit, but this comes with a raising risk of thermal conduction between the hot filament and the isolation means walls, which may ultimately result in calcium deposit.

This means that when approximately 1-2 kW of power should be emitted in the 2.2 µm wavelength region, a filament surface of approximately 177 cm$^2$ is required. The presently disclosed and/or claimed inventive concept(s) hence aims at providing a volumetric heating device in which a maximum filament surface is provided in a compact lamp volume.

For the case of water, the absorption coefficient is approximately between $10^{-4}$ and $10^{-3}$ per cm. This means that a water film of ca. 0.5 to 5 mm, such as (but not limited to) 1 to ca. 2 mm thickness surrounding the emission source suffices to absorb more than 99% of the emitted energy. In certain non-limiting embodiments, the volumetric heating device is hence a flow-through heating device with the emission source arranged in a center position separated from the liquid to be heated by the isolation means.

To the inventive device, the heat exchanger equation applies where the temperature differential depends only on the input heating power and the flow rate. It is hence independent from the volume. The time, which is required for a cold start-up, however, depends on the heater volume and the heater power. Taking the power of a conventional heater in a beverage preparation machine of about 1250 W (Watts) and the specific heat capacity of water (4.19 J/gK) the following formula can be used to determine the heat-up time $t_{hu}$:

$$t_{hu} := \frac{c_w \cdot w_w \cdot 70° \text{ C.}}{1250 \text{ W}}$$

In the above formula, $t_{hu}$ denotes the heat-up time, $c_W$ denotes the specific heat capacity of water, $w_W$ denotes the volume of water to be heated and 70° C. denotes the temperature to which the water should be heated. The denominator of 1250 W denotes the power used for heating.

On the other hand, from a given flow rate and a temperature difference, the heater power can be calculated.

$$T_O := T_0 + \frac{1250 \text{ W}}{f_w \cdot c_w}$$

In this formula, $T_O$ denotes the output temperature, $T_0$ denotes the ambient temperature of 21° C., 1250 W again, denotes the power of the heating device/power source, $f_W$ denotes the flow rate and $c_W$ again denotes the specific temperature/heat capacity of water. In this case, the flow rate is approximately 5 g/sec. As can be seen, the output temperature is about 75 to 85° C., in particular about 81° C. (e.g. 80.66° C.).

Of course the presently disclosed and/or claimed inventive concept(s) is in no way limited to the range of 1-2 kW. In particular applications may require more power (e.g. 5-10 kW and especially 8 kW-12 kW). This is e.g. the case for applications, where short heat up time is an issue and the flow rate is higher than e.g. 5 ml/sec or 5 g/sec. For example the same volumetric heating device can be used with a flow rate of approximately 50 ml/sec and 8 kW to heat the liquid from 20° C. to 60° C. useful for a shower or similar washing applications.

This result is independent of the volume heated. Hence, the heat-up can be optimized independent from the flow rate and the temperature difference. In general, the smaller the volume to be heated, the shorter the heat-up time. The output temperature in a steady flow regime is not influenced by the chosen volume.

When using volumetric heating with infrared light, the high absorption coefficient of the liquid, especially of water, allows for a very compact design of the heating device and the volume to be heated can be reduced to around 10 ml. This allows cold start times of 5 to 7 sec, such as (but not limited to) 3 sec.

As already indicated above, one aspect of the presently disclosed and/or claimed inventive concept(s) relates to provision of a new structure for the filament used as the emission source.

To achieve a high surface area as required for the volumetric heating of the liquid, the presently disclosed and/or claimed inventive concept(s) proposes arrangements of folded or flat strips, such as (but not limited to) formed of metal with a high electrical resistance. This "stripe filaments" are better suited for energy emission than conventional wire-based filaments. Especially, the strips can be arranged to show essentially a meandering or polygonal cross-section outline to provide a high-emission surface.

Figure 2:
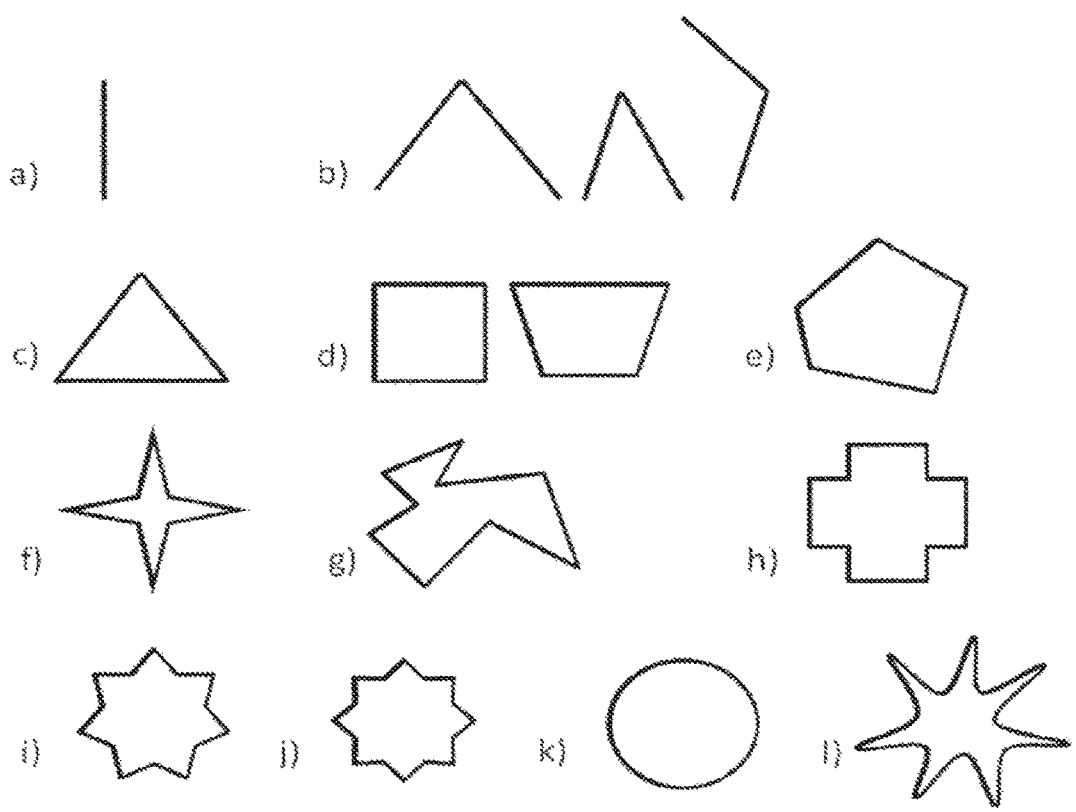
FIGS. 2a)-2l) show basic examples of cross section outlines of a filament.

Examples for cross-section outline are shown in FIGS. 2a)-2k). Of course, other configurations are possible. In particular, the exemplary cross section outlines show neglect details like electric connection means needed to connect the filament to a power source, as well as the spatial configuration of the filament along an axis essentially orthogonal to the cross section pane.

In general, an emission source configured as a stripe filament arrangement can accommodate a much higher filament surface in the same volume when compared to the standard approach using wire-based filaments, wherein the wire is wound in a helix.

Figure 3:
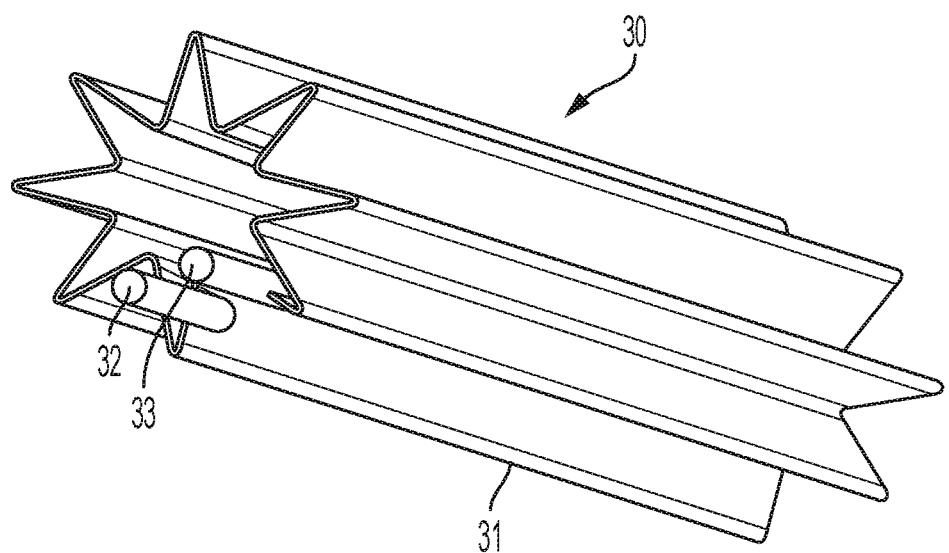
FIG. 3 shows an exemplary emission source according to the presently disclosed and/or claimed inventive concept(s).

One example for an emission source 30 according to the presently disclosed and/or claimed inventive concept(s) using a stripe filament 31 is shown in FIG. 3. As can be seen, the filament 31 essentially has a star-shaped cross section outline, similar to the exemplary cross section outline shown in FIGS. 2j) and 2l). FIG. 3 also shows electric connection means 32, 33 adapted for providing electric energy to the filament 31.

The filament 31 shown in FIG. 3 is designed to radiate energy inwards as well as outwards. In order to adapt the ohmic resistance of the filament 31 to a power source (not shown) supplying for example 220 V mains, advantageously a meander formed cross section outline is provided, e.g. as shown in FIG. 2l).

Figure 4:
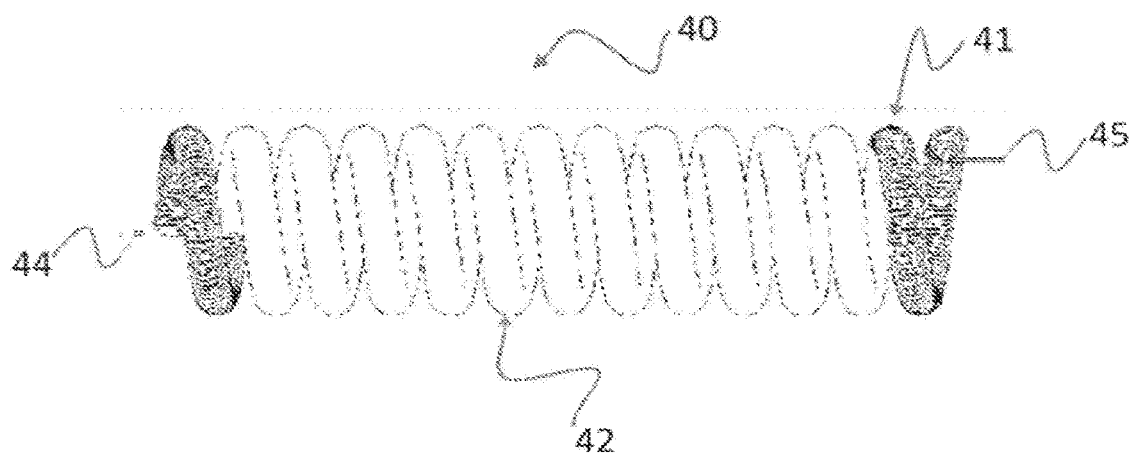
FIG. 4 shows an exemplary filament configuration.

In comparison, an emission source 40 is shown in FIG. 4 with a filament 41, 42 based on a more traditional winding structure. Here a wire is wound to form a double-helix, meaning that the helical wound wire 41 is, again, used to form a second helical structure 42. However, also helix of higher order are known and used as a filament to obtain a high filament surface. Also shown are the electrical connection means 44, 45 used to directly or indirectly connect the emission source 40 to a power source.

Figure 5:
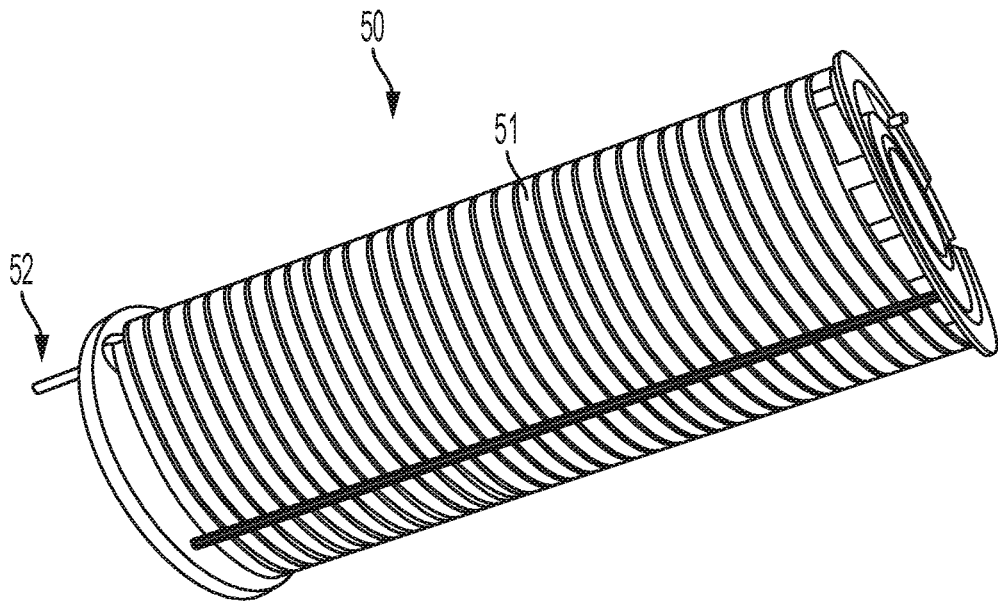
FIG. 5 shows a further example of an emission source according to the presently disclosed and/or claimed inventive concept(s).

Of course, the emission source can also be configured to show a combination of both approaches. For example, FIG. 5 shows another form of an emission source 50 with a stripe shaped filament 51 wound to a helical structure. An electrical connection means 52 is also shown. This emission source essentially shows a cross section outline as shown in FIG. 2k).

Figure 6:
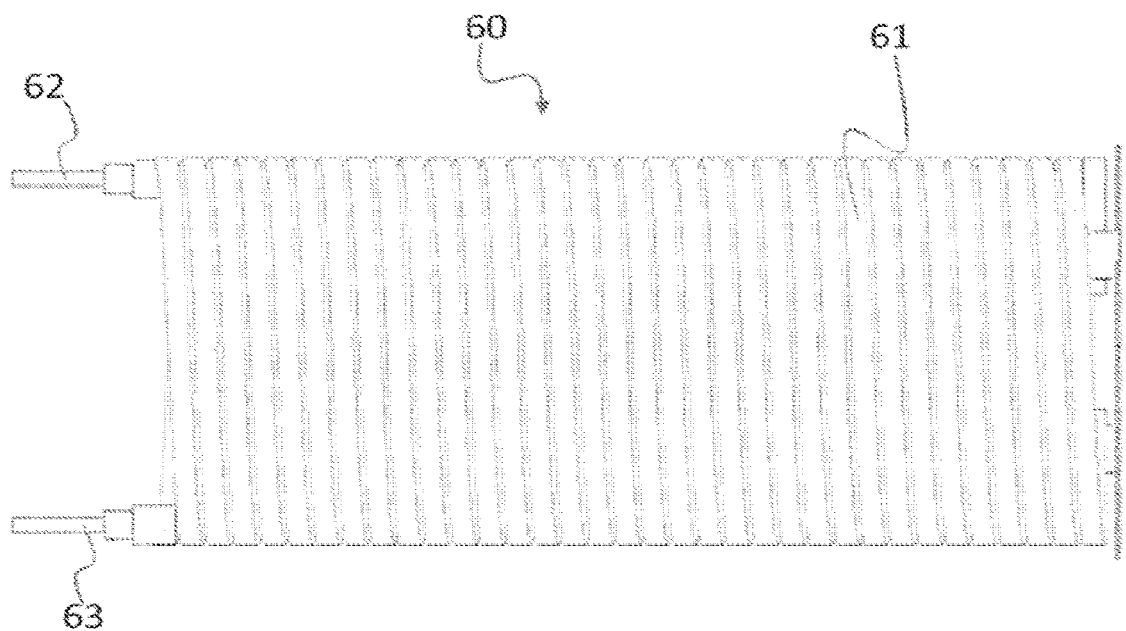
FIG. 6 shows a schematic side view of the further emission source of FIG. 5.

FIG. 6 shows a side view of the emission source shown in FIG. 5, where the emission source 60 shows the stripe shaped filament 61 wound to a helical structure. Also electrical connection means 62, 63 are shown.

However, a general problem concerning self-irradiation of the filament is present. Self-irradiation means that portions of the emitted energy is not emitted to the outside, i.e. towards the liquid to be heated, but towards other portions of the filament, e.g. towards adjacent windings or surfaces.

This has the effect that parts of the filament are heated to a higher temperature than expected or calculated and hence the emission source can behave unexpectedly. For the case of volumetric heating, this effect is disadvantageous.

Figure 7:
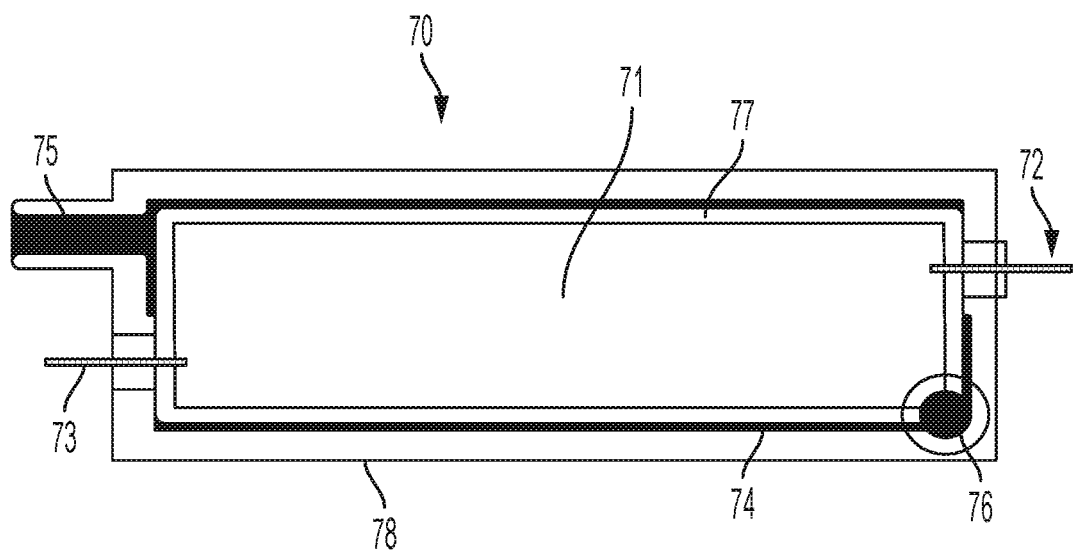
FIG. 7 shows an example of an volumetric heating device.
Figure 8:
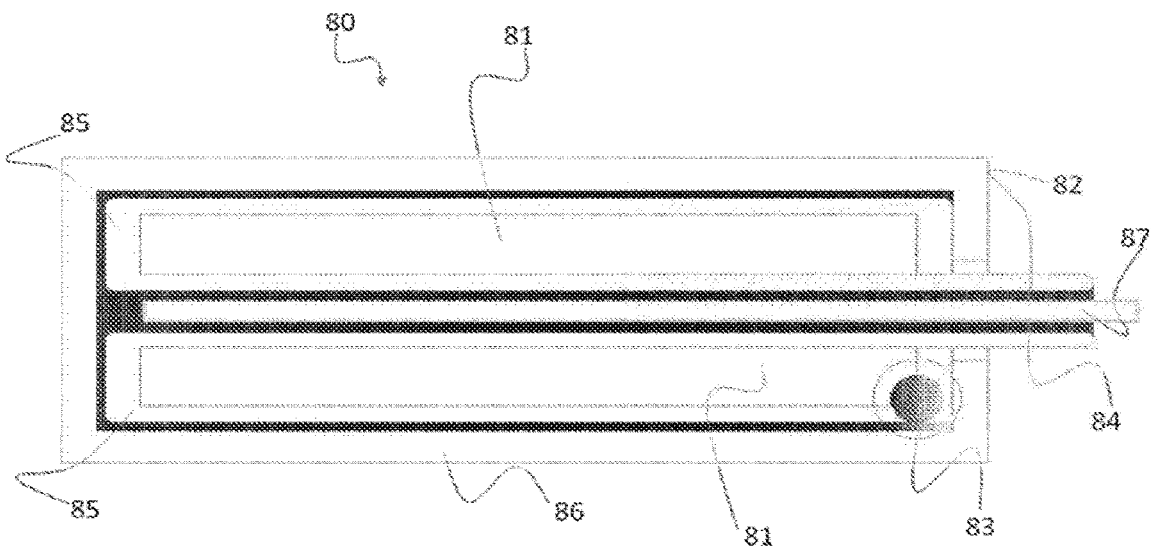
FIG. 8 shows another example of a volumetric heating device.

In order to improve the situation, the filament can be arranged surrounding a central pipe functioning as the isolation means, which is for example formed from glass, in particular quartz glass, to heat the liquid conveyed through a tube. FIGS. 7 and 8 show two examples for configurations of for volumetric heating cells.

FIG. 7 shows a volumetric heating device 70 in which an emission source 71, connected to a power source by electrical connection means 72, 73 is surrounded by a volume of the liquid 74 to be heated, for example water.

The liquid 74 enters the volumetric heating device through inlet 75. The liquid is then conveyed around the emission source 71 to outlet 76. Of course, the liquid can also be conveyed into the opposite direction, where the inlet 75 serves as outlet and the outlet 76 serves as inlet.

The volume and the speed in which the liquid is conveyed are dimensioned in a way, so that the liquid leaving the volumetric heating device provides a specific desired temperature.

In FIG. 7, the emission source is isolated from the liquid by isolating means 77. FIG. 7 also shows that a cover means 78 is used to guide the liquid along the emission source 71.

To reduce the problem of self-irradiation of the filament the design of FIG. 7 can be changed to the design of the volumetric heating device 80 shown in FIG. 8.

Here the emission source 81 is not only surrounded by the liquid 82 to be heated, but the liquid 82 is also conveyed through a hollow portion provided by the emission source 81 and the isolation means 85, respectively. In particular, the liquid 82 enters the volumetric heating device 80 through inlet 83 and is conveyed around the emission source 81 to outlet 84. Of course, the liquid can also be conveyed into the opposite direction, where the inlet 83 serves as outlet and the outlet 84 serves as inlet. In FIG. 8 also the reflective displacement body 87 is shown.

The volume and the speed in which the liquid is conveyed are dimensioned in a way, so that the liquid leaving the volumetric heating device provides a specific desired temperature.

In FIG. 8, the emission source is isolated from the liquid by isolation means 85. FIG. 8 also shows that a cover means 86 is used to guide the liquid along the emission source 81. The electrical connection means are not shown.

The efficiency of the volumetric heating device can be further increased if the walls, e.g., of the cover means pointing towards the emission source are made of a reflective material, e.g. a mirroring material.

An important aspect is that the total volume of the volumetric heating device consists of three parts: 1) an outer volume, 2) a transition zone and 3) an inner volume.

Concerning the repartition of these volumes, two aspects should be mentioned: The first concerns the volumetric heating device arrangement for "best efficiency" and the second the arrangement for the shortest "cold start" time (which has of course also an influence on the former):

For "best efficiency," the particular setting of one non-limiting embodiment is to have a hot outlet from the inner volume, e.g. the volume between the isolation means 85 and the reflective displacement body 87, thus preventing heat losses to be radiated to the outside. This can reduce the requirements for an outer isolation of the volumetric heating device (or eliminate it altogether), which can be arranged such as never to attain high temperatures. This may also be an advantage when personal safety is considered (no risk of hurting persons by hot parts). Another argument for providing the cold inlet from the outside, e.g. on the cover means or feeding the volume between the isolation means 85 and the cover means 86, is that when epoxy glue can be used to seal the volumetric heating device. In this arrangement it is guaranteed that the glue is efficiently cooled by the cold liquid.

Considering an arrangement as e.g. shown in FIG. 8, it can be assumed that half of the emitted energy of the filament goes inside and the other half to the outside. This may of course not be true strictly, but my serve as an approximation. When the volumetric heating device filled with liquid goes through a "cold start" cycle, the time for the liquid at the hot outlet to reach the target temperature depends only on the inner volume.

This fact permits to optimize this feature separately, by making the inner volume as low as possible. The means to achieve this is by the reflective displacement body 87. For example if the total volume is about 13 ml, and the inner volume is reduced to about 3 ml, the cold start time will be reduced significantly: It takes only about 3 seconds to heat the 13 ml by 1250 Watts, but less than 1.5 seconds to heat 3 ml by 600 Watts.

Yet in the steady flow regime, nothing would change as the output temperature depends only on the flow rate.

To have a small inner volume means that for steady flow conditions (i.e. in the steady flow regime), a unit volume of liquid shall transit the inner volume more quickly and hence shall be accelerated in the transition zone. With this repartition of volume of the volumetric heating device, it should be stated that the transition zone should be as small as possible (having no effects on heating), and used to accelerate the liquid flow.

Practical requirements result from part tolerances: the diameter tolerances of the involved parts may be dangerously close to the water film thickness. Therefore it is an advantage to provide a rotating liquid movement e.g. around a main axis of the volumetric heating device, which has the effect to smooth out all sorts of unevenness or tolerances such as of filament emitted power and of dimensional variations of cover means diameter and wall thickness.

Figure 9A:
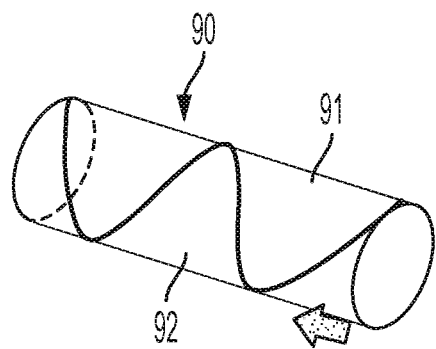
FIGS. 9a)-d) show example configurations for the volumetric heating device.

FIGS. 9*a*)-9*d*) show example configurations for a heating device according to the presently disclosed and/or claimed inventive concept(s). While FIGS. 9*a*)-9*d*) all schematically show a helically wound filament 92, 92', 92", 92'" inside the isolation means, it should be understood that the filament can be of a different form as set out above.

In FIGS. 9*a*)-9*d*) the solid arrows indicate a possible flow of the liquid along the emission source 90, 90', 90", 90'". In FIGS. 9) and 9*d*) exemplary alternative flow directions are indicated by the dotted and dashed arrows.

In the case of FIG. 9*a*), the liquid flows along an outside surface of the emission source 90, separated from the liquid by isolation means 91.

Figure 9B:
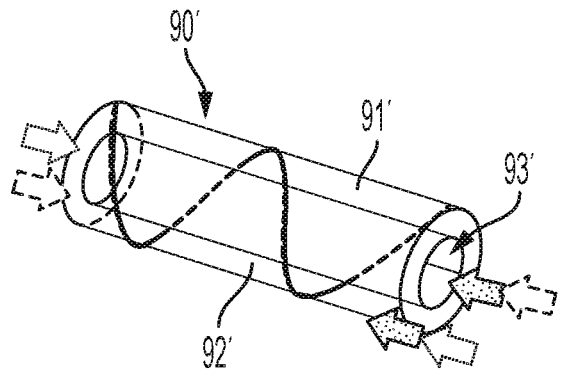

FIG. 9*b*) shows an alternative to the configuration of FIG. 9*a*), where the liquid is passed along an isolation means surface 91' of the emission source 90' containing the filament 92' but also through a hollow portion 93' formed in the emission source 90'. Of course, also in the hollow portion 93', the emission source is separated from the liquid by an isolation means, which may or may not be made of the same material as the isolation means 91'.

As stated above, the solid arrows indicate possible directions taken by the liquid along the emission source 90' while the dotted and dashed arrows symbolize alternative directions taken by the liquid. In particular, while the liquid can be conveyed along the outer surface formed by the isolation means 91'/through the hollow portion 93' of the emission source 90' in one direction, it can be conveyed through the hollow portion 93'/along the outer surface formed by the isolation means 91' of the emission source 90' into an opposite direction. In particular, the cover means 94" can be used to deflect the liquid and/or to change the conveying direction of the liquid.

Figure 9C:
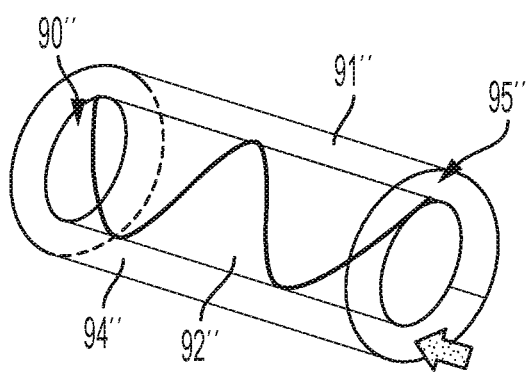

FIG. 9*c*) shows a further alternative, in which the liquid is only conveyed along an outer surface of the emission source 90" formed by the isolation means 91". The emission source 90" is separated from the liquid by isolation means 91", but is passed inside a cover means 94". Hence a volume 95" of the liquid to be heated is defined by the distance of the cover means 94" to the isolation means 91".

Figure 9D:
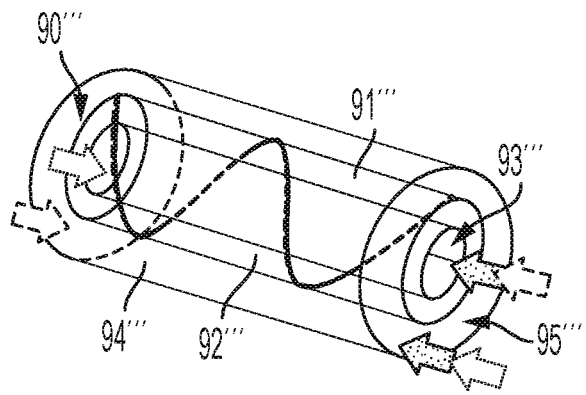

FIG. 9*d*) shows a configuration in which the liquid is passed through a hollow portion 93'" as well as along an outer surface formed by the isolation means 91'" of the emission source 90'". The emission source 90'" in FIG. 9*d*) also shows a cover means 94'", which at least partially surrounds the emission source 90'".

As stated above, the solid arrows indicate possible directions taken by the liquid along the emission source 90'" while the dotted and dashed arrows symbolize alternative paths taken by directions of the liquid. In particular, while the liquid can be conveyed along the outer surface formed by the isolation means 91'" of/through the hollow portion 93'" of the emission source 90'" in one direction, it can be conveyed through the hollow portion 93'"/along the outer surface formed by the isolation means 91'" into an opposite direction. In particular, a cover means 94'" can be used to deflect the liquid and to change the conveying direction of the liquid.

Also the liquid is only conveyed along an outer surface of the emission source 90'" formed by the isolation means 91'", which also separates the liquid from emission source 90'", but inside a cover means 94'". Hence a volume 95'" of the liquid to be heated between the cover means 94'" and the outer surface of the emission source 90'" formed by the isolation means 91'" is defined by the distance of the cover means 94'" to the isolation means 91".

Of course, all configurations of FIGS. 9*a*)-9*d*) only show schematically how a volumetric heating device could be configured. Generally, while the liquid flow can be freely designed, in certain non-limiting embodiments, it is desired to keep cold liquid flowing on the outside of the volumetric heating cell, e.g., with reference to FIG. 8, between the cover means 86 and the isolation means 85, and the heated liquid on the inside of the volumetric heating cell, e.g., also with reference to FIG. 8, between the isolation means 85 and a reflective displacement body 87.

Figure 10:
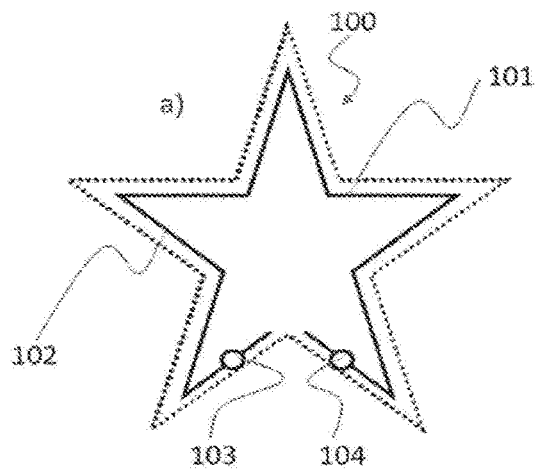
FIGS. 10a) and 10b) show further example configurations for the volumetric heating device.
Figure 10:
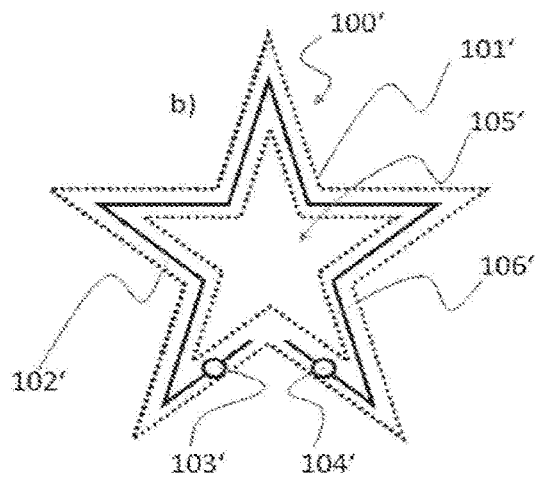

Configurations with a star shaped cross section outline of the emission source corresponding to the configurations shown in FIGS. 9a) and 9b) are shown in FIGS. 10a) and 10b), where emission sources 100, 100' are shown. A filament 101, 101' is also provided with a star-shaped cross section outline.

The filament 101, 101' is surrounded by an isolation means 102, 102', along an outer surface of which the liquid can be passed. Also indicated are electric connection means 103, 104, 103', 104'.

The configuration of FIG. 10b) corresponds to the configuration of FIG. 9b), where the filament 102' is surrounded by an outer isolation means 101'. Also again the connection means 103', 104' for electrically connecting the filament to a power source are indicated. This configuration also shows a hollow portion 105', which is separated from the emission source/filament by an inner isolation means 106'. Of course, the isolation means 101' 106' does not have to be integrally formed from one material or in one part, but may consist of several parts and also these parts may be formed from different material. The materials, however, should be essentially transparent or semi-transparent to the emitted energy.

Figure 11:
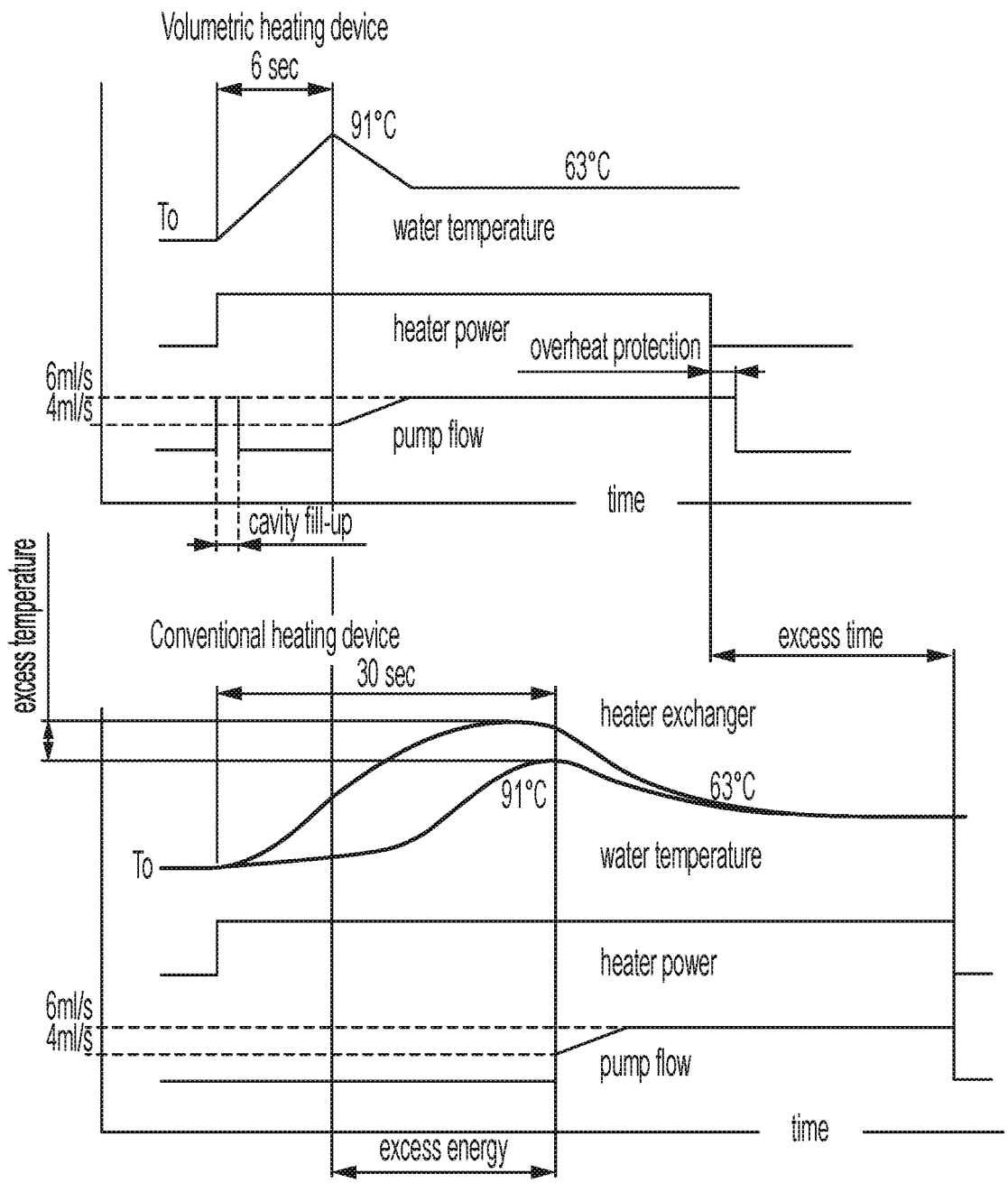
FIG. 11 shows a diagram detailing differences between a volumetric heating device and a conventional heating device with a heat exchanger.

FIG. 11 shows the benefits of the volumetric heating device (top) in comparison to a conventional heating device (bottom) with a heat exchanger. Water is used as an example liquid. As can be seen, the heat-up time is considerably shorter. The heat-up time to heat water to a temperature of about 91° C. (after the volume to be heated is filled (cavity fill-up)) is reduced as there is no excess temperature generated (see the diagram for the conventional heating device). Especially, the heat exchanger does not need to be heated to a higher temperature than the liquid in order to heat the liquid to achieve a desired temperature.

Hence, the overall power consumption of the volumetric heating device is much lower than the power required by a conventional heating device. Especially, the temperature for the volumetric heating device increases linearly in comparison to the exponential temperature curve associated with the conventional heating device using a heat exchanger.

In summary, the presently disclosed and/or claimed inventive concept(s) allows providing a maximum filament surface in a small volume emission source and also allows to effectively provide the liquid to be heated to the emission source, as in certain non-limiting embodiments, the liquid surrounds the emission source from all sides and hence absorbs entirely the emitted radiation.

The efficiency of the emission source can be increased by application of a reflective material to a cover means. Also in the hollow portion a reflective means can be arranged, for example, on a rod or tube leading through the hollow portion, such as (but not limited to) having a cross sectional outline following the cross sectional outline of the isolation means/the emission source.

Advantageously, the inventive emission source is arranged in a beverage preparation machine and is formed as a central lamp including the isolation means and is immersed into the liquid to be heated. The lamp can provide a hollow portion/hole through which the liquid to be heated is passed/conveyed. The filament can be a wire wound in a helix, but also multiple helix structures can be used, for example, many wires can be used wound in a helical fashion, for example a double-helix or a helix of a higher order in order to provide a large emission surface. Of course, the emission source can be formed as a filament form from a flat metal sheet. Also, a combination of the filaments described herein can be used in the lamp to further increase the efficiency of the lamp.

The liquid can either be conveyed by a pump or by any other liquid mass transporting means.

Figure 12:
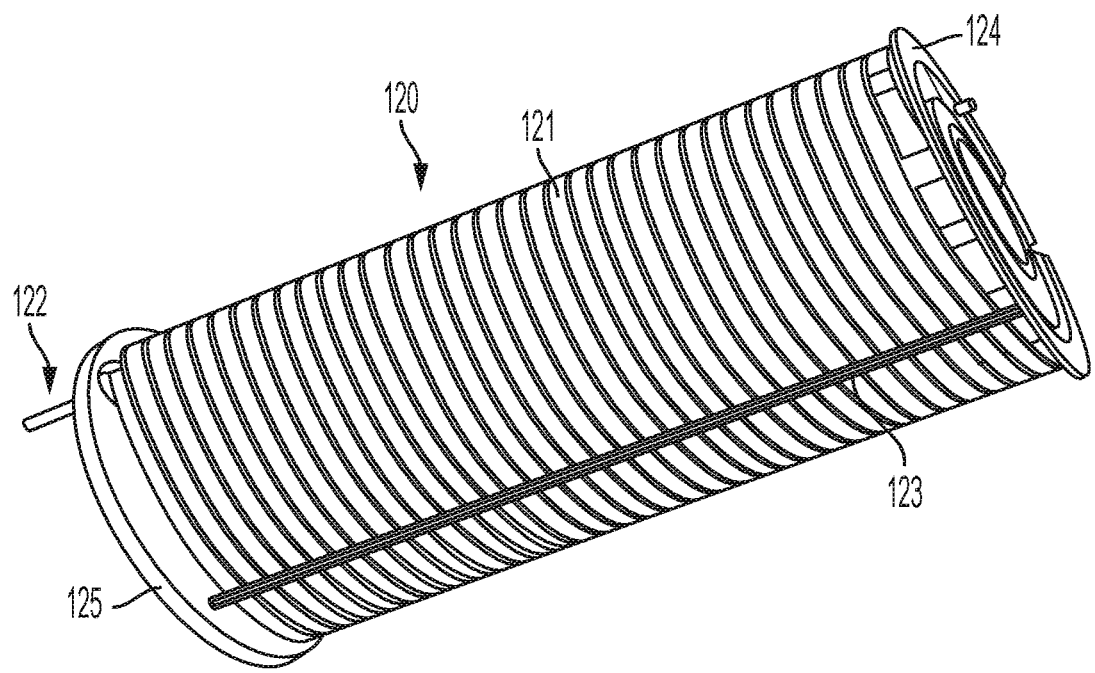
FIG. 12 shows the further example of an emission source of FIG. 5 in more detail.

A specific embodiment of the presently disclosed and/or claimed inventive concept(s) is now described departing from the embodiment shown in FIG. 5 and is explained in more detail in FIG. 12.

FIG. 12 again shows the other form of the emission source 120 with a stripe shaped filament 121 wound to a helical structure. In certain non-limiting embodiments, the filament 121 has a diameter of 30 to 50 mm, such as (but not limited to) of 40 mm, while the filament windings are arranged with a pitch of 1.5 to 3.5 mm, such as (but not limited to) 2.5 mm.

The filament 121 shows a surface of about 160 to 180 $cm^2$, such as (but not limited to) about 170 or 171 $cm^2$. In one example the presently disclosed and/or claimed inventive concept(s) shows a bifilar filament. The power rating of the filament when using a power source of e.g. 230V is in the range from 1.5 kW to 1.25 kW, such as (but not limited to) 1.25 kW. In certain non-limiting embodiments, the filament is formed of Kanthal AE, a ferritic iron-chromium-aluminum alloy (FeCrAl alloy) with good form stability and service life. It is suitable for use at temperatures up to 1300° C. and especially has a width of 0.05 to 0.15 mm, in particular, 0.1 mm.

An electrical connection means 122 is also shown. FIG. 12 also shows at least an outer structure that is used to accommodate the windings of the filament 121 in order to hold them in place and to maintain the desired space between filament windings.

The outer structure is referred to as "outer comb" 123 due to its design. The outer comb 123 is attached on one side to a bridge plate 124 and may be connected to a base plate 125. In certain non-limiting embodiments, the bridge plate 124 is formed of stainless steel and is connected to the filament by spot welding. A particular (but non-limiting) example of material thickness of the bridge plate is 0.2 to 0.4 mm, such as (but not limited to) 0.3 mm. In a bifilar setup, the filament 121 actually can be formed of two filaments portions. Referring back to FIG. 6, a first filament portion is connected to a first electric connection means 62, while a second filament is connected to a second electric connection means 63. Both filament portions then lead to bridge plate 124, which forms a conductive connection between the filament portions.

Figure 13A:
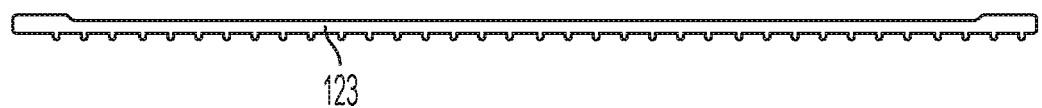
FIGS. 13a) and 13b) show a detail of an specific embodiment (outer comb).
Figure 13B:
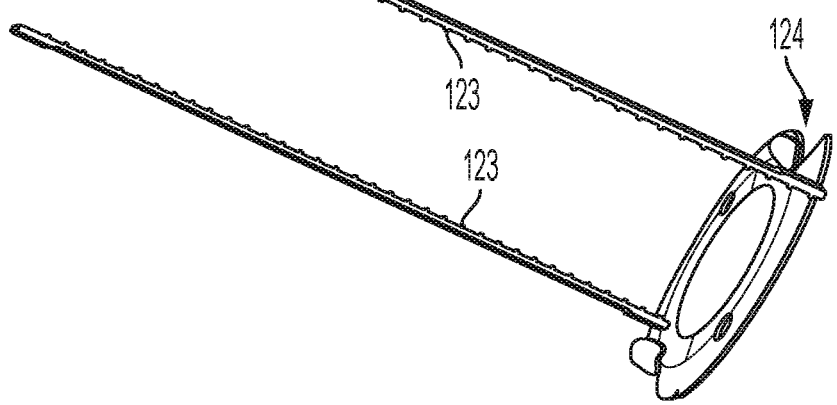

A side view of the outer comb 122 is shown in FIG. 13a) while FIG. 13b) shows the bridge plate 124 with two connected outer combs 123. Essentially, the arrangement shown in FIG. 13b) corresponds to the arrangement of FIG. 12, after the base plate 125, the filament 121 and the electrical connection means 122 are removed.

In certain non-limiting embodiments, the outer comb is formed of a non-conductive material, e.g. a ceramic material and shows a material thickness of 0.5 to 1.1 mm, such as (but not limited to) 0.8 mm. The outer comb provides a plurality of teeth with a width of 0.45 mm to 0.50 mm, such as (but not limited to) 0.45 mm. The teeth may be spaced 1.95 to 2.15 mm apart from each other, such as (but not limited to) 2.05 mm. Of course, more than two inner combs can be provided, e.g. to increase the stability of the filament. The inner comb may be attached to the bridge plate by a snap-in connection/connector.

Not clearly visible but also present in FIG. 12 is at least an inner structure, also used to accommodate the windings of the filament 121 in order to hold them in place and to maintain the desired space between filament windings. This inner structure is due to its form referred to as "inner comb" in the following.

Figure 14A:
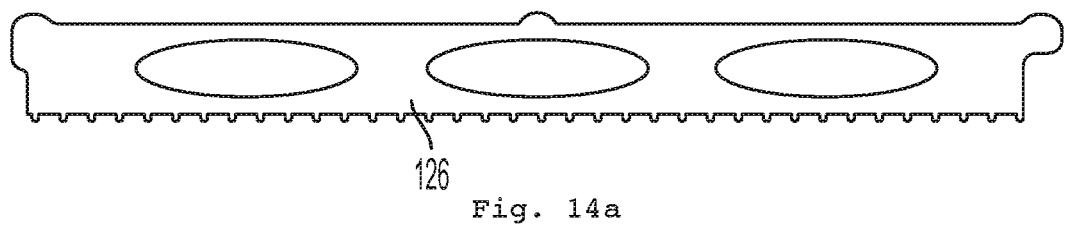
FIGS. 14a) and 14b) show a detail of an specific embodiment (inner comb).
Figure 14B:
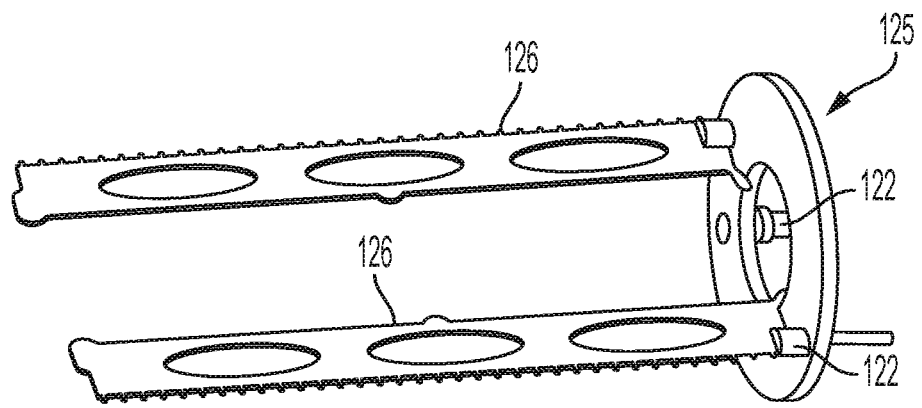

A side view of the inner comb 126 is shown in FIG. 14a) while FIG. 14b) shows the base plate 125 with two connected inner combs 126. Essentially, the arrangement shown in FIG. 14b) corresponds to the arrangement of FIG. 12, after the bridge plate 124, the filament 121 and the outer combs 123 are removed.

Also, it is shown that the electrical connection means 122 is connected to an inner comb 126. In certain non-limiting embodiments, the inner comb is formed of a non-conductive material, e.g. a ceramic material and shows a material thickness of 0.5 to 1.1 mm, such as (but not limited to) 0.8 mm. The inner comb provides a plurality of teeth with a width of 0.40 to 0.50 mm, such as (but not limited to) 0.45 mm. The teeth may be spaced 1.95 to 2.15 mm apart from each other, such as (but not limited to) 2.05 mm. Of course, more than two inner combs can be provided, e.g. to increase the stability of the filament. In certain non-limiting embodiments, the base plate 125 is formed of aluminum oxide. A particular (but non-limiting) example of material thickness of the base plate is 1 to 3 mm, such as (but not limited to) 2 mm.

Figure 15:
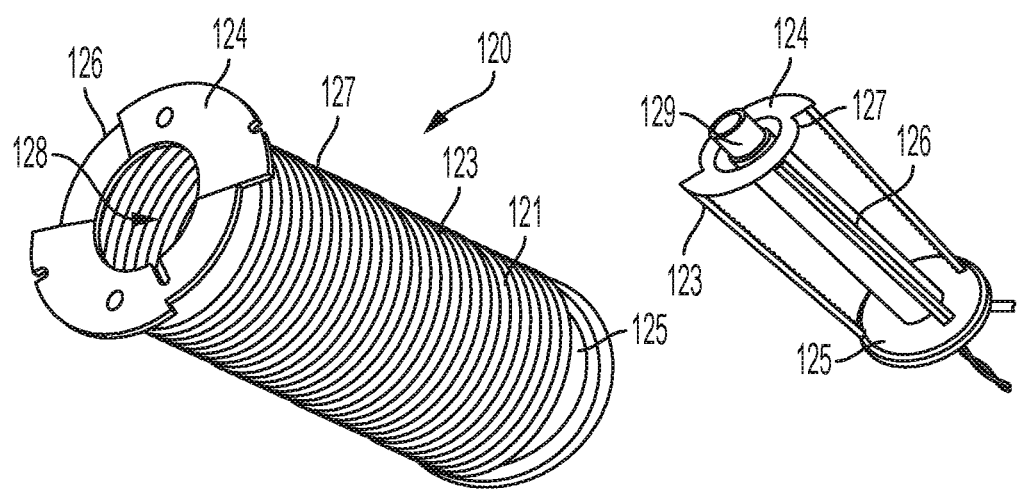
FIG. 15 shows example configurations of the emission source.

FIG. 15 shows an alternative view of the arrangement of FIG. 12, which on the left-hand side shows the emission source 120 with a stripe shaped filament 121 wound to a helical structure. Also, the outer comb 123, the bridge plate 124, the base plate 125 and the inner comb 126 are shown. Additionally, a connecting point 127, where the filament 121 is connected to the bridge plate 124 is shown. Also, the hollow portion 128 of the emission source 120 is clearly visible.

The right-hand side of FIG. 15 shows a similar view, where the same features are denoted by the same reference signs as in the left hand view. The filament 121 is not shown to allow for a better understanding of the internal configuration. Moreover, a reflective displacement body 129 is shown, which will be explained in more detail below. The inner comb 123, the base plate 125 and the outer comb 126 may also be formed of a ceramic material.

Figure 16:
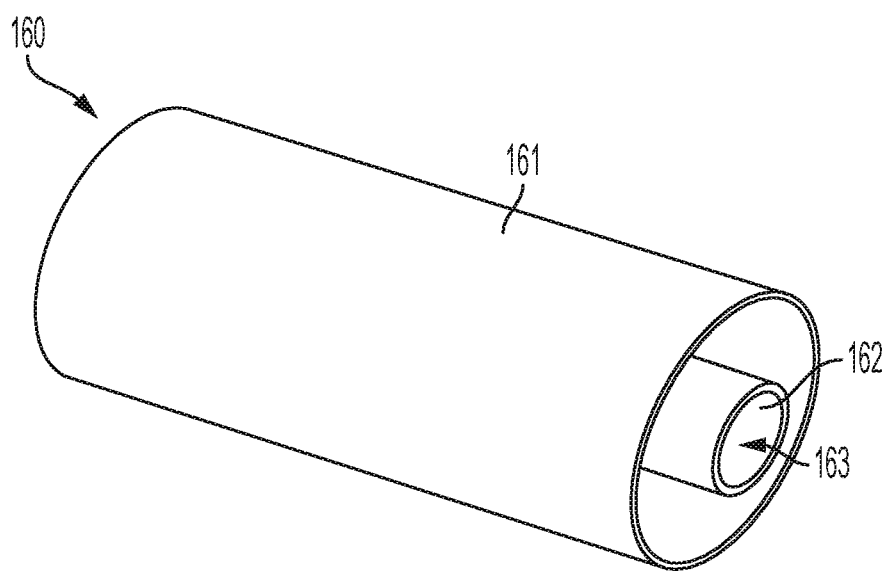
FIG. 16 shows an example of an isolation means.

FIG. 16 now shows isolation means 160, which may be formed of, for example (but not limited to) glass, and in particular from quartz glass or borosilicate glass and/or 'vitroceramic' material, electrically isolating the emission source and in particular the filament, from the liquid. The isolation means 160 in particular provides outer surfaces 161, 162 as well as a hollow portion 163.

Figure 17:
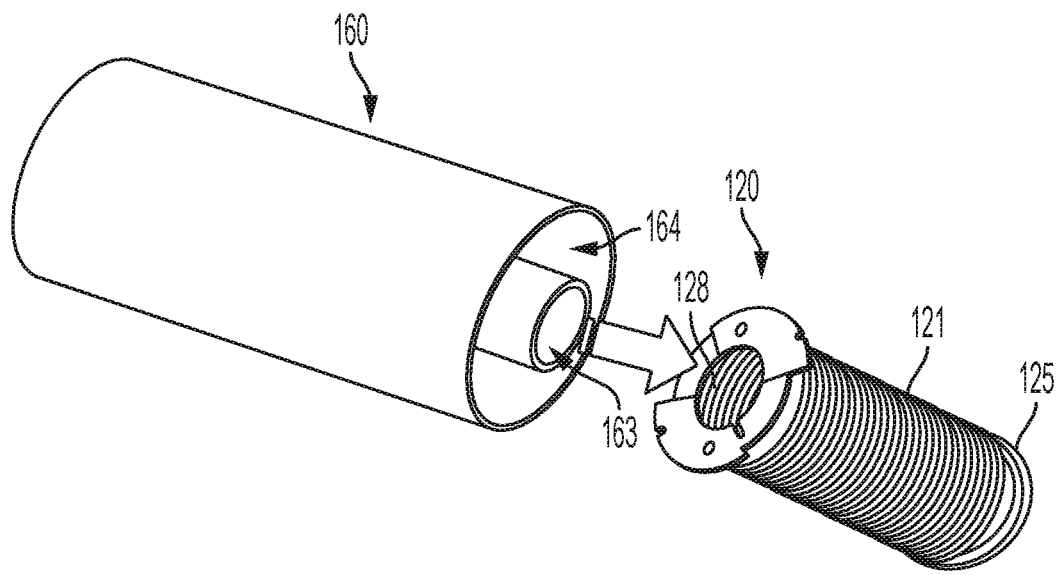
FIG. 17 schematically shows a combination of an emission source and an isolation means.

FIG. 17 now shows how the emission source 120 is moved into the isolation means 160.

In particular, the hollow portion 128 of the emission source 120 is moved inside the isolation means, so that the hollow portion 128 of the emission source 120 accommodates the hollow portion 163 of the isolation means 160. After the combination, the isolation means 160 surrounds the filament 121 to the inside and the outside. In particular, the base plate 125 essentially seals off a chamber 164 defined by the isolation means 160. The sealing may be provided by epoxy glue, which may be desired (in certain non-limiting embodiments) when an outer inlet is used as a cold liquid inlet, effectively cooling the parts to be sealed.

Figure 18:
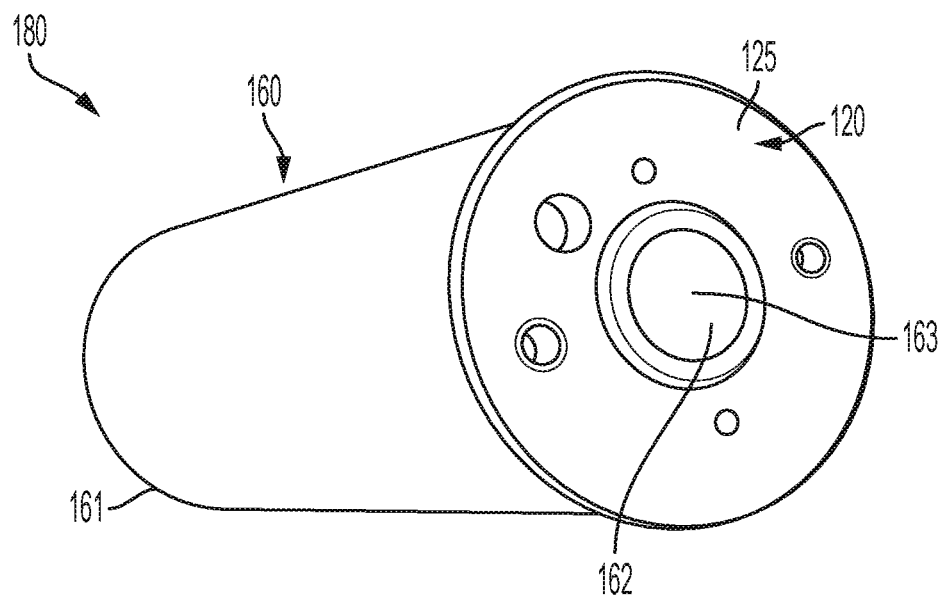
FIG. 18 schematically shows a ready combination of an emission source and an isolation means.

This is more apparent from FIG. 18, which shows a combined device 180 after combination of the emission source 120 and isolation means 160. The chamber 164 is now sealed by the base plate 125 and the outer surfaces 161, 162 of the isolation means 160 are forming the outer surface of the combined device 180, with the exception of the surface formed by the base plate 125.

As outlined above, the liquid is conveyed along surfaces 161, 162 of the isolation means 160. Hence, the volumetric heating device may comprise a device that moves the liquid. The volumetric heating device may hence provide a pump used to move the fluid by lift, displacement, and gravity.

Additionally, the volumetric heating device may comprise a liquid channeling arrangement used to channel the liquid flowing along a first outer surface 161 to a second outer surface 162, or vice versa. The volumetric heating device hence provides a liquid conduit from a liquid inlet of the volumetric heating device to a liquid outlet. The liquid conduit is thereby at least partially formed by the liquid channeling arrangement.

Figure 19:
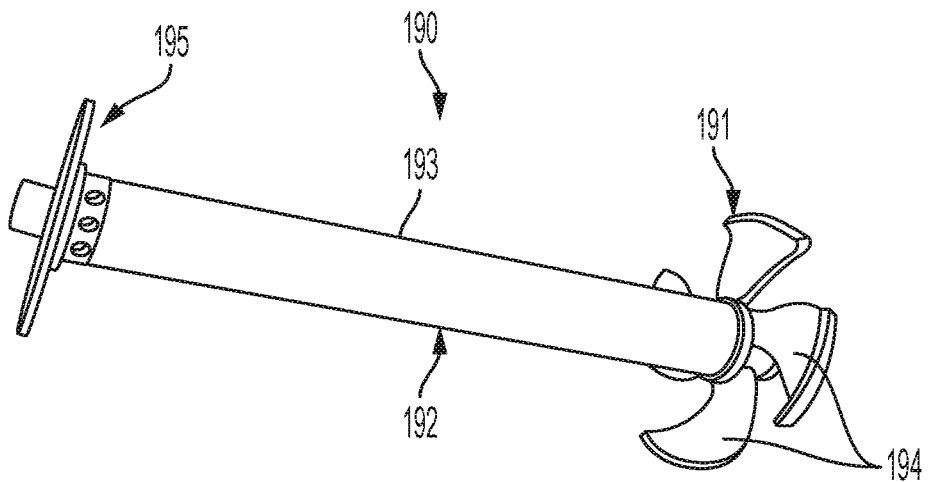
FIG. 19 shows an example of a liquid channeling arrangement.

An example for such a liquid channeling arrangement 190 is shown in FIG. 19. The arrangement comprises a channeling element or guidance means 191, which may be formed from a stiff or flexible material and can be essentially "fan-shaped" as shown in the FIG. 19. In certain non-limiting embodiments, the guidance means is formed from silicone rubber. The guidance means 191 is connected to a reflective displacement body 192, which is adapted to be arranged in the hollow portion 163 of the isolation means 160 shown in FIG. 16. The guidance means hence in one embodiment shows a blade configuration with blades 194. The guidance means 191 especially serves to accelerate the liquid flow in a transition zone and give it a twist to accommodate the tolerances. Especially, the guidance means 191 is designed to set the liquid into a rotational movement when the liquid passes the guidance means 191. In certain non-limiting embodiments, the guidance means 191 hence is provided to cause the liquid to rotate around the main symmetry axis of the volumetric heating device as outlined above.

A surface 193 of the reflective displacement body 192, also shown in FIG. 15 as reflective displacement body 129, may be (but is not limited to being) reflective, for example is made of a material mirroring the emitted energy. The surface 193 of the reflective displacement body 192 may be (but is not limited to being) polished and is in particular made of an alloy, e.g. an aluminum alloy (e.g. AlMgSi). Also, when arranged in the hollow portion 163 of the isolation means 160, a gap is maintained between the second outer surface 162 and the surface 193 of the reflective displacement body 192 to allow passage of the liquid. Hence, the thickness of the liquid film conveyed between the second outer surface 162 and the surface 193 of the reflective displacement body is defined by the dimension of the gap.

FIG. 19 also shows a connecting means 195 used to connect the guidance means 191 and the reflective displacement body 192 to the base plate 125. The reflective displacement body 192 also defines a distance and placement of the guidance means 191 relative to the connecting means 195.

Figure 20:
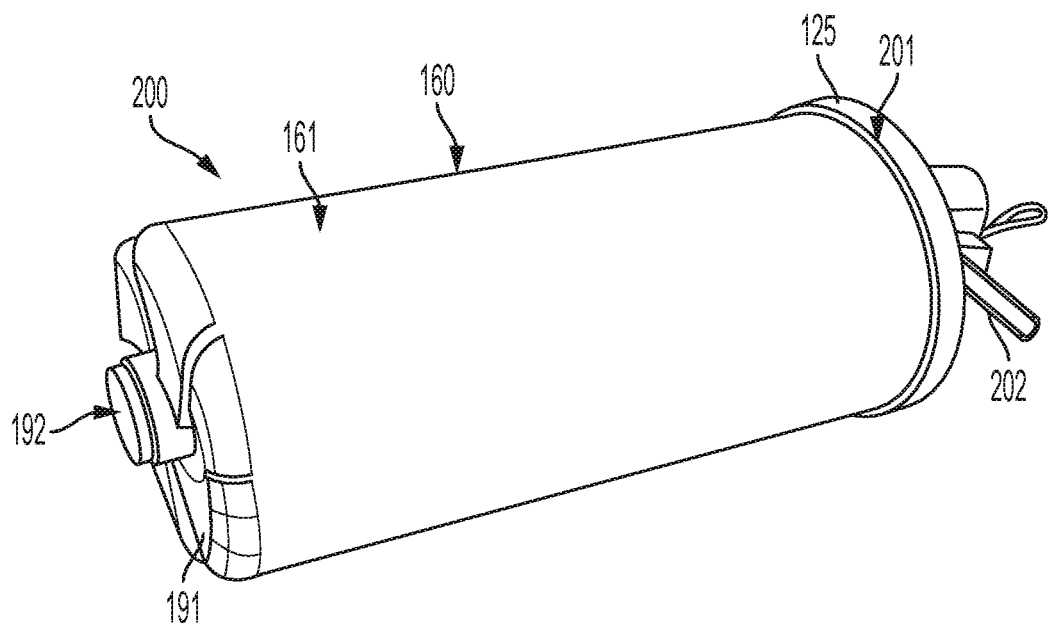
FIG. 20 shows a volumetric heating device according to the presently disclosed and/or claimed inventive concept(s).

FIG. 20 shows a combination 200 of the combined device 180 of FIG. 18 and the liquid channeling arrangement 190 of FIG. 19. The first outer surface 161 of the isolation means 160 is shown, but also the guidance means 191, arranged on the opposite side of the isolation means as the base plate 125 and the reflective displacement body 192, arranged in the hollow portion 163 of the isolation means 160 (not indicated here). The combination 200 also provides a sealing member 201, which is later used to prevent leaking of the liquid when the combination 200 is finally arranged in a cover means. Combination 200 also provides a first supply means 202, which can serve as an inlet or outlet for the liquid to be heated.

Figure 21:
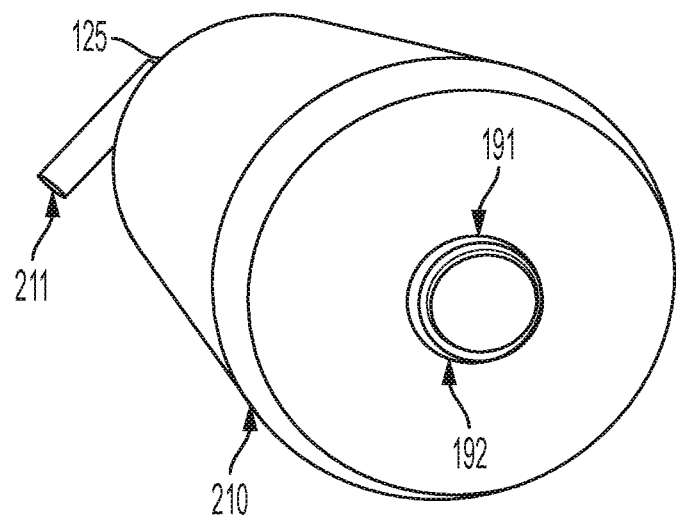
FIG. 21 is a perspective view of a volumetric heating device according to the invention where the covering means is visible.

The combination 200 of FIG. 20 is now shown arranged in a cover means 210 in FIG. 21. It is shown that the reflective displacement body 192 optionally protrudes from the cover means 210. Also, a portion of the guidance means 191 may be provided to the outside of the cover means 210. On the far end of the cover means 210 the base plate 125 is displayed, which together with the sealing member (e.g. an O-ring) seals of the cover means. In certain non-limiting embodiments, the cover means 210 is made of a non erosive material, such as (but not limited to) a metal, e.g. Aluminum. In certain non-limiting embodiments, the cover means also shows a pressure resistance of 10 to 30 bar, such as (but not limited to) 20 bar. FIG. 21 also provides a second supply means 211, which can serve as an inlet or outlet for the liquid to be heated.

The guidance means 191 has the purpose of directing the liquid passed along the first outer surface 161 to the second outer surface 162. In the example also shown in FIG. 19, the guidance means 191 is configured to provide a material structure, which allows the liquid to be directed to the hollow portion 163 of the isolation means 160 to flow between the guidance means 191 and a surface 193 of the reflective displacement body 192.

In FIG. 19, the guidance means 191 is exemplarily equipped with "fan" blades 194 that meet the cover means 210 after the cover means 210 is applied to the volumetric heating device. After application of the cover means 210, i.e. after the cover means 210 is moved along the first outer surface 161 of the isolation means 160 such as (but not limited to) up to the base plate 125, the gaps between the blades 194 of the guidance means 191 provide channels, in which the liquid can flow towards the gap between the isolation means 160 and the reflective displacement body 193. Effectively, as the blades 194 meet an inner cover means surface and an outer surface of the isolation means 160, e.g. the first outer surface 161 of the isolation means 160, the liquid cannot flow where the blades 194 are present and hence takes the path between the blades 194. The blades 194 hence guide the liquid and in particular present a barrier to the liquid and.

However, it should be understood, that the guidance means 191 can be configured differently. For example, the guidance means 191 could be a mat with channels, grooves and/or ridges, that may extend (for example but not by way of limitation) radial or in a spiral from the reflective displacement body 192. The channels and/or grooves can have the same depth as the material thickness of the guidance means ("cuts") or be of lower depth. Also, the guidance means 191 could generally be at least partially made of porous material or material permeable by water.

Figure 22:
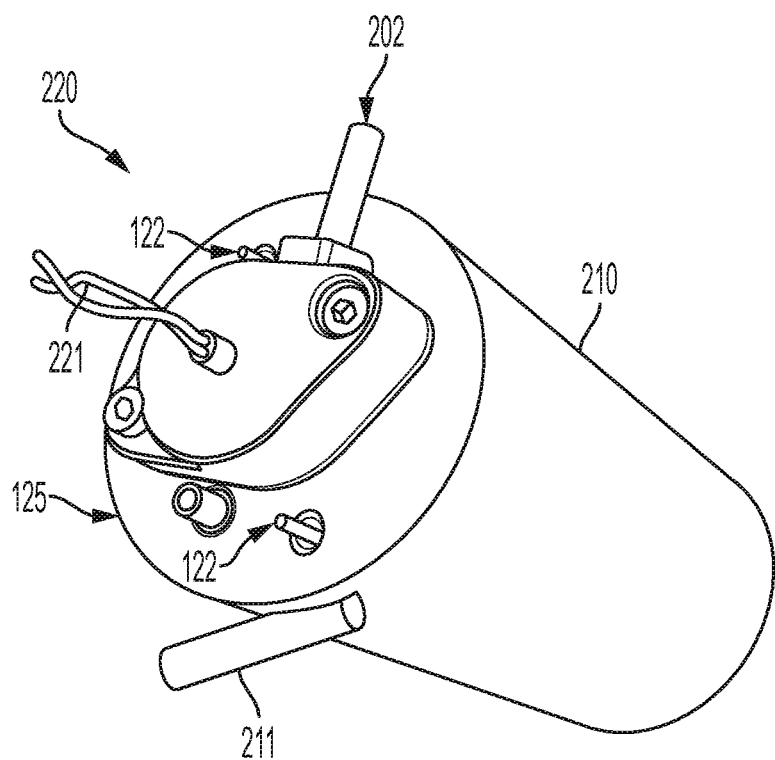
FIG. 22 is a perspective view of a volumetric heating device according to the invention where the base plate is visible.

FIG. 22 now shows the volumetric heating device 220 with the cover means 210 and the base plate 125. As can be seen, the previously described electric connecting means 122 protrudes from the base plate in order to be connected to a power source. The first and the second supply means 202 and 211 used to transfer the liquid to be heated into and out of the volumetric heating device 220 are also visible.

In addition, leads 221 may be provided to connect a sensor provided in the volumetric heating device 220, such as (but not limited to) a temperature and/or pressure sensor, with a control unit (not shown) in order to adjust the liquid temperature and/or pressure, e.g. the amount of energy emitted by the emission source and/or to adjust the speed with which the liquid is conveyed.

The invention claimed is:

1. A volumetric heating device for beverage preparation machines, comprising:
an emission source designed for emitting electromagnetic radiation in an infrared and/or ultra violet spectrum and transferring an electromagnetic energy to a beverage liquid surrounding the emission source, wherein the emission source comprises an ohmic filament coupled to electric connection means adapted for providing electric energy to the emission source, wherein a cross-section outline of the ohmic filament is polygon or circular shaped, wherein the beverage liquid is used in a preparation of at least one of coffee or tea;
a liquid conduit containing the emission source, the liquid conduit configured to channel the beverage liquid flowing from a liquid inlet to a liquid outlet;
an isolation means essentially transparent to the electromagnetic radiation in an emitted spectrum, and designed to electrically isolate the emission source from the beverage liquid, and wherein the isolation means is formed from glass, and wherein at least a portion of the ohmic filament is arranged inside the isolation means; and
wherein the volumetric heating device is configured to supply the beverage liquid to the isolation means in a beverage liquid film of a thickness of approximately 0.5 to 6 mm.

2. The volumetric heating device according to claim 1, wherein the volumetric heating device is configured to selectively supply the beverage liquid to the isolation means to at least partially immerse the isolation means into the beverage liquid.

3. The volumetric heating device according to claim 1, wherein the isolation means is quartz glass and/or borosilicate glass, and wherein the isolation means is configured to thermally isolate the emission source from the beverage liquid.

4. The volumetric heating device according to claim 1, wherein the cross-section outline of the ohmic filament is selected from the group consisting of: triangle shaped, rectangle shaped, and star shaped.

5. The volumetric heating device according to claim 1, wherein the thickness of the beverage liquid film is determined by a percentage of energy to be absorbed by the beverage liquid.

6. The volumetric heating device according to claim 1, wherein the thickness of the beverage liquid film is 1 to 4 mm.

7. The volumetric heating device according to claim 1, wherein the emission source and the isolation means are at least partially surrounded by a cover, the cover being arranged in a specific distance to the isolation means to at least partially form the liquid conduit.

8. The volumetric heating device according to claim 7, wherein the cover is designed to define the thickness of the beverage liquid film.

9. The volumetric heating device according to claim 1, wherein the volumetric heating device further comprises a fan-shaped element configured to cause a rotational movement of the beverage liquid passing the fan-shaped element.

10. The volumetric heating device according to claim 1, wherein the emission source emits the electromagnetic radiation in an infrared spectrum centered at a wavelength of 2.2 µm or greater.

11. The volumetric heating device according to claim 1, wherein the beverage liquid is water.

12. A beverage preparation machine configured to serve warm beverages, comprising:
a volumetric heating device comprising:
an emission source designed for emitting electromagnetic radiation in an infrared and/or ultra violet spectrum and transferring an electromagnetic energy to a beverage liquid surrounding the emission source, wherein the emission source comprises an ohmic filament coupled to electric connection means adapted for providing electric energy to the emission source, wherein a cross-section outline of the ohmic filament is polygon or circular shaped, wherein the beverage liquid is used in a preparation of at least one of coffee or tea;
a liquid conduit containing the emission source, the liquid conduit configured to channel the beverage liquid flowing from a liquid inlet to a liquid outlet;
an isolation means essentially transparent to the electromagnetic radiation in an emitted spectrum, and designed to electrically isolate the emission source from the beverage liquid, and wherein the isolation means is formed from glass, and wherein at least a portion of the ohmic filament is arranged inside the isolation means; and
wherein the volumetric heating device is configured to supply the beverage liquid to the isolation means in a beverage liquid film of a thickness of approximately 0.5 to 6 mm.

13. The beverage preparation machine according to claim 12, wherein the beverage preparation machine is configured to serve at least one of coffee or tea.

14. The beverage preparation machine according to claim 12, wherein the beverage liquid is water.

15. A volumetric heating device for a beverage preparation machine, wherein the beverage preparation machine is configured to serve at least one of coffee and tea, the volumetric heating device comprising:
an emission source designed for emitting electromagnetic radiation in an infrared spectrum and transferring an electromagnetic energy to a beverage liquid at least partially surrounding the emission source, wherein the emission source comprises a helically wound ohmic filament coupled to electric connection means adapted for providing electric energy to the emission source, wherein a cross-section outline of the helically wound ohmic filament is polygon or circular shaped, and wherein the beverage liquid is water used in a preparation of at least one of coffee or tea;
a liquid conduit to channel the beverage liquid flowing from a liquid inlet to a liquid outlet;
an isolation means essentially transparent to the electromagnetic radiation in an emitted spectrum, and designed to electrically isolate the emission source from the beverage liquid, wherein the isolation means is formed from glass, and wherein at least a portion of the helically wound ohmic filament of the emission source is arranged inside the isolation means; and
wherein the volumetric heating device is configured to supply the beverage liquid to the isolation means in a beverage liquid film of a thickness of approximately 0.5 to 6 mm.

* * * * *